United States Patent [19]

Henfrey et al.

[11] 4,321,227
[45] Mar. 23, 1982

[54] INJECTION MOULDING PROCESS AND APPARATUS

[75] Inventors: Basil Henfrey, Kloof; Kenneth R. Hart, Durban, both of South Africa

[73] Assignee: AECI Limited, Johannesburg, South Africa

[21] Appl. No.: 127,304

[22] Filed: Mar. 5, 1980

[30] Foreign Application Priority Data

Apr. 12, 1979 [ZA] South Africa ............ 79/1782

[51] Int. Cl.³ ............................ B29F 23/02
[52] U.S. Cl. .................... 264/167; 264/328.7; 264/328.8
[58] Field of Search ............ 264/167, 328.7, 328.8

[56] References Cited

U.S. PATENT DOCUMENTS 2,969,563  1/1961  Hendry ................ 264/328.7
3,992,503  11/1976  Henfrey ................ 264/167

FOREIGN PATENT DOCUMENTS 1030124  5/1958  Fed. Rep. of Germany.

Primary Examiner—Thomas P. Pavelko
Attorney, Agent, or Firm—Cushman, Darby & Cushman

[57] ABSTRACT

The invention concerns a method and apparatus for injection moulding elongated plastics articles, such as pipes, in welded-together units. The process comprises the steps of (i) providing a mould having an open end closed by one or more gates, an inner mandrel within the mould and defining between its outer surface and the inner surface of the mould the shape of the article to be moulded; (ii) injecting molten plastics material into the space between the mould and the inner mandrel; (iii) moving the newly moulded unit of hollow plastics article at least partially onto a mandrel which was exterior of the gates of the mould when the molten plastics material was being injected, with the rear end of the unit of the article in a position in the mould for another unit of the hollow plastics article to be welded thereto as it is formed in the mould during the next moulding step; (iv) allowing the formed unit of the hollow plastics article to cool outside the mould; and (v) repeating steps (ii), (iii) and (iv) until the desired length of hollow plastics article has been formed.

4 Claims, 3 Drawing Figures

INJECTION MOULDING PROCESS AND APPARATUS

This invention relates to a process and apparatus for injection moulding hollow plastics articles.

Injection moulding apparatus known to the applicants utilises moulds which split into two or more sections in order to release the moulded product. The injection machines involved have two plattens, at least one of which and occasionally both are movable. The moulds are attached to the plattens and move with them. When injecting the plastics material, and during subsequent cooling, the parts of the moulds are held together by high pressure on the plattens. This requires accuracy to bring the parts of the mould together with precision and necessitates the provision of an injection moulding machine of substantial size and expense.

An invention of this type was made by the present inventors and enables a continuous length of ribbed plastics pipe to be made in a step-by-step manner. The ribbed pipe is made by injection moulding a length of pipe between male and female mould members, disengaging the female mould from the moulded pipe length, ejecting the moulded pipe length along the male mould, engaging the female mould with the inner end of the moulded pipe length to form a closure to the mould cavity, injecting further material into the mould cavity to form a further length of pipe homogeneously welded to the first length, and repeating these operations until the desired length of pipe has been made.

This earlier process of the inventors enables large diameter ribbed pipes (e.g. of about 500 mm diameter) to be manufactured. Such pipes have many uses, including use as sewage pipes. In this process, there are no gases to close the mould. Instead, the rear end of the length of ribbed pipe which has been moulded and ejected along the mould, acts as the end closure for the mould when the split female moulds are closed again. The new length of pipe moulded in the next step is rigidly attached to the said rear end from the previous step.

Although the process has great commercial potential, it does have the disadvantages referred to above. It would be desirable to provide a process which is even more advantageous than the inventors' earlier process.

The present invention provides an apparatus for injection moulding hollow plastics articles, said apparatus comprising a mould having an open end closed by one or more gates, an inner mandrel within the mould, said inner mandrel defining between its outer surface and the interior surface of the mould, the shape of the article to be moulded, an exterior mandrel of not larger cross-sectional size than the inner mandrel and positioned exteriorly of the gates, ram means for moving the inner mandrel axially towards and away from the gates to permit the exterior mandrel at least partially to replace the inner mandrel within the newly moulded hollow article, whereby cooling thereof can take place exteriorly of the mould, and inlet means for injecting heated plastics material into the space between the mould and the inner mandrel.

The invention also provides a process for injection moulding hollow plastics articles, which comprises the steps of (i) providing a mould having an open end closed by one or more gates, an inner mandrel within the mould and defining between its outer surface and the inner surface of the mould, the shape of the article to be moulded, (ii) injecting molten plastics material into the space between the mould and the inner mandrel, (iii) moving the newly moulded unit of hollow plastics article at least partially onto a mandrel which was exterior of the mould when the molten plastics material was being injected, with the rear end of the unit of the article in a position in the mould for another unit of the hollow plastics article to be welded thereto as it is formed in the mould during the next moulding step, (iv) allowing the formed unit of the hollow plastics article to cool outside the mould, and (v) repeating steps (ii), (iii) and (iv) until the desired length of hollow plastics article has been formed.

With the process and apparatus provided by the invention, hollow cylindrical articles, including articles having a flange at one end, can be made in a simple continuous manner. With the invention, it is not necessary to split the body of the mould. This enables one to dispense with much of the machinery required for conventional injection moulding presses, thereby providing a saving in machinery cost and floor space. With the very first unit moulded, closing the open end between the gates and the mandrels can take place using a removable annular blocking device.

The mould itself may be machined from a block of metal and bolted to a single fixed platten which can be fitted to the injector unit of an injection moulding machine with suitably dimensioned bars. Injection of plastics material into the mould can take place through a suitably positioned hole in the platten.

The mould cavity can be of hollow substantially cylindrical shape. An outwardly extending annular space can be provided adjacent to the gates whereby the hollow article to be formed will be a ribbed pipe. One end of the mould may be sealed by a block holding the inner mandrel in a manner which permits the inner mandrel to be reciprocated from its central position by an amount which will be sufficient to enable the article to be removed from it onto the exterior mandrel. The amount of movement may be equal to at least the length of the article to be produced in the mould.

The exterior mandrel may be fast with the inner mandrel but of smaller average cross-section. The exterior mandrel can be thermally insulated from the inner mandrel to assist in cooling of the article. The exterior mandrel may taper axially away from the inner mandrel.

The open end of the mould conveniently is closed by two moving plates which are shaped to close around the inner mandrel, thereby completing the mould itself. The plates may be held in position either mechanically or hydraulically during injection.

After injection has taken place, the article may be allowed to cool in the closed mould for a short cooling period which need be no longer than is required to allow the material in the mould to set sufficiently for withdrawal of the article from the inner mandrel.

After the unit of moulded plastics article has been formed on the inner mandrel, it has to be moved from the inner mandrel to the exterior mandrel to cool thereon. In one embodiment, the ram means can be adapted to move the inner mandrel at least partially outside the gates and then moves back to its initial position while gripping means hold the newly moulded article sufficiently for it to slide at least partially onto the exterior mandrel.

In another and presently preferred embodiment, the ram means can be adapted to move the inner mandrel initially away from the gates to cause it to withdraw at least partially from the unit of newly moulded hollow plastics article while causing the exterior mandrel to slide inside the unit of newly moulded hollow plastics article while it is still in the mould, and thereafter, to move the inner mandrel back to its original position so that the exterior mandrel and the newly moulded article thereon are then at least partially outside the mould. The gates are opened at the appropriate times to permit the unit on the exterior mandrel to pass through and then closed for the next injection step.

The exterior mandrel conveniently is of smaller cross-section than the inner mandrel. The newly moulded unit of the article then will shrink onto the exterior mandrel so that, when the ram moves forwards again (i.e. towards the gate) the newly moulded unit of the article will be in the correct position for the next injection of plastics material and for the welding onto that material in the mould.

In the first embodiment, a separate gripping means is provided, but the unit of the article should be allowed to cool sufficiently to avoid undue marking of it with the gripping means. In the second embodiment, the inner surface of the mould acts as a gripping means while the inner mandrel is being withdrawn.

While the cycle is being repeated, the front part of the previously made unit of the article on the extension mandrel can be cooled while a new unit is being welded to its rear end by injection moulding. Cooling can be carried out with a water spray or by coming into contact with chilled metal plates having the same profile as the moulded article. The chilled plates may be attached to the gates to open and close with the gates. Once the article has been cooled it may be handled.

The hollow cylindrical article conveniently may be a modular unit of a pipe, gutter or the like elongated article. It may or may not be ribbed on its exterior surface. As can be seen, the pipe may be made up in modular units equal to the interior length of the mould. The modular units may be joined together within the mould.

The invention can be used for making a relatively wide range of pipes, for example from about 100 mm diameter up to about 300 mm diameter. The length of the module will depend on the size of the mould. A convenient length for each module is in the range of about 100 mm to about 200 mm. The pipes, or the like, manufactured according to the invention may be used for water non-pressure pipes, pressure water pipes, cable ducts or the like. The time taken to manufacture a module can be in the region of less than one minute, conveniently about 30 seconds per module.

In addition to providing a convenient method of making modular articles, especially pipes, the invention also enables a large reduction in capital cost and a saving in floor space to be obtained. For example, machinery of the type presently used by the applicant to produce pipes of the sizes referred to above can cost in the region of R200 000 to R500 000 at this time. Contrary thereto, machinery to produce a pipe according to the invention can cost in the region of only R50 000 to R100 000. Furthermore, since the mould does not have to be made in two units which have to be matched, there is a considerable saving in the mould manufacture. The mould may be turned from solid metal and a pair of conventional sliding plates can be used as the gates.

When making a ribbed pipe, the pipe may be provided with a single rib spaced at the end adjacent to the sliding gates, so that the unit containing the single rib may easily be removed from the mould by moving the article axially of the mould. A plurality of ribbed modules may be connected together by plastics joining procedures, eg by leaving a short section of the previously moulded article in the mould and injecting the heated plastics material of the new about to be formed, article around it. In addition to circumferential ribs, the pipes may have longitudinal ribs.

The invention is illustrated by reference to the accompanying drawing in which.

Figure 1:
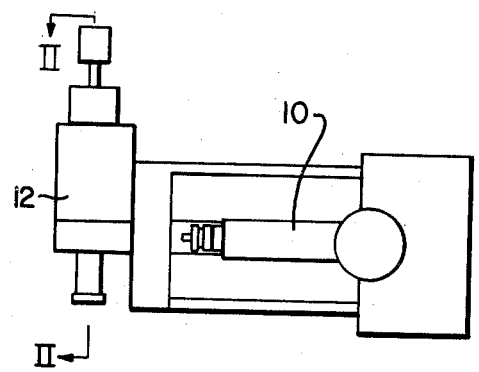
FIG. 1 is a plan view of an injection moulding apparatus for use according to the invention.

In these Figures, a standard injection moulding unit 10 feeds hot plastics material to a temperature-controlled mould 12.

The mould 12 has an inner mandrel 14 defining between it and the interior surface of the mould 12, the shape of the article to be formed, in this case a ribbed pipe. The mould 12 has an annular indentation 16 adjacent to gates 18, 18.1. The inner mandrel 14 is integral with an exterior mandrel 20 of no larger cross-sectional size but separated from it by thermal insulation 22.

The inner mandrel 14 has annular holes 24, 24.1 and the mould 12 has holes 26, 26.1 for cooling water. Similar holes 28, 28.1 for cooling water are provided in the exterior mandrel 20.

The gates 18, 18.1 are operated hydraulically by cylinders 30, 32. Molten plastics material is injected from the unit 10 along path 34 into the space between the inner mandrel 14 and the mould 12.

The inner mandrel 14 connects with ram rod 36 of hydraulic ram 38.

Figure 2:
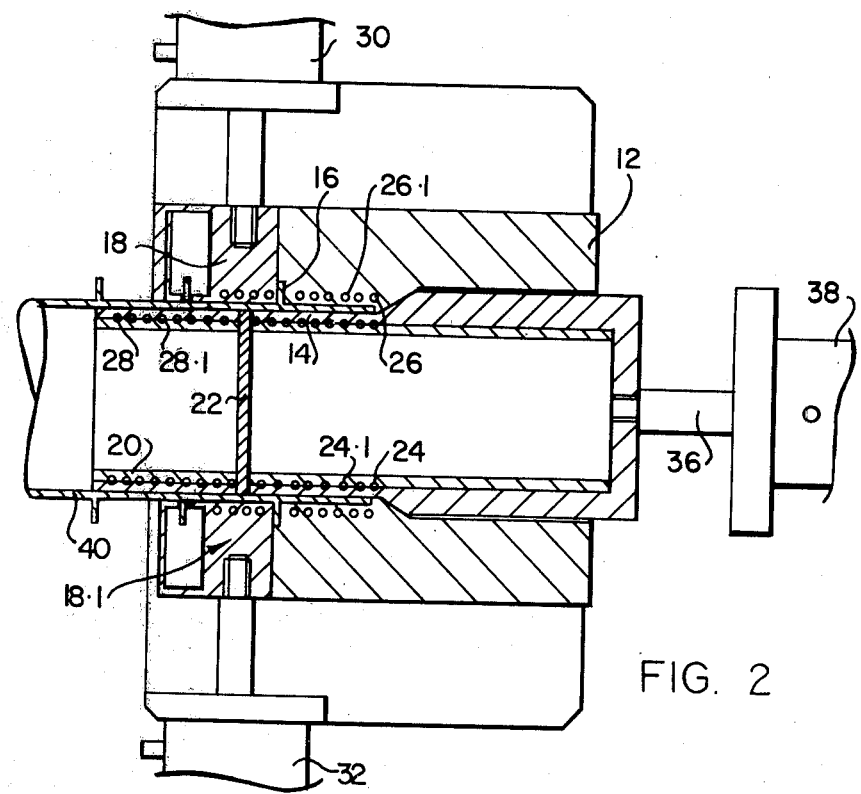
FIG. 2 is a cross-section through II—II of FIG. 1.
Figure 3:
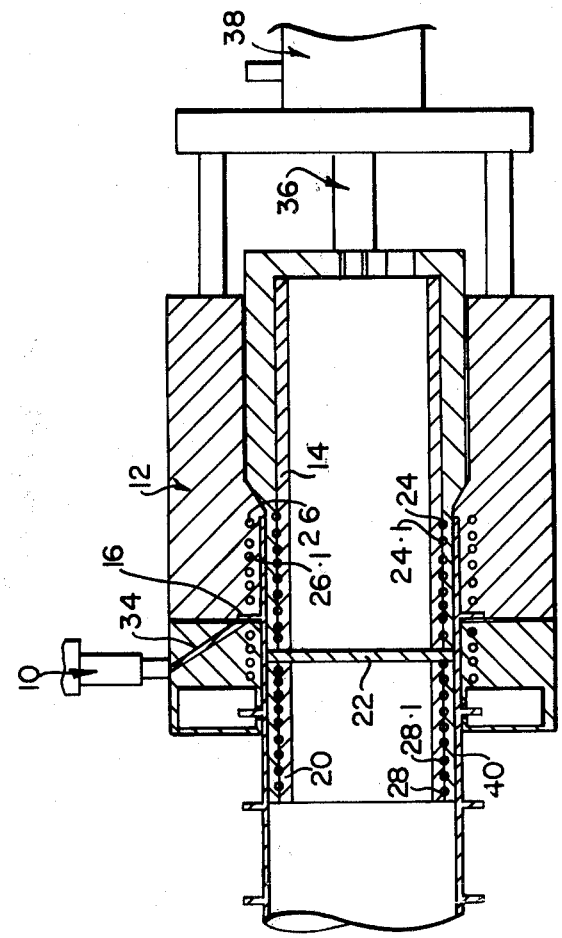
FIG. 3 is a further cross-section along II—II but at right angles to the section of FIG. 2.

When operating the apparatus, the mandrels are initially in the positions shown. After injection of the molten plastics material, and a short cooling period, the ram rod 36 moves the mandrels 14 and 20 to the right, thereby causing the unit 40 of ribbed pipe to be positioned on the exterior mandrel 20 as it is moved into the mould. The gates 18, 18.1 are opened and the exterior mandrel 20, with the unit 40 of pipe on it, are moved to the left so that the unit 40 is outside the mould. The cooling water assists in allowing the pipe unit to cool outside the mould. The gates 18, 18.1 are again closed and the apparatus is in the position shown in FIGS. 2 and 3 for the next injection moulding.

We claim:

1. A process for injection moulding hollow plastics articles, which comprises the steps of (i) providing a non-split mould having first and second opposite ends and being immovable laterally of the axial ends thereof, a movable inner mandrel extending from the first end into the mould and defining between its outer surface and the inner surface of the mould the shape of the article to be moulded, inlet means for injecting heated plastics material into the space between the mould and the inner mandrel, said second end being an open end for removal of the article and being provided with gates capable of lateral movement relative to the outer surface of the mould for closing said second end, an exterior mandrel of not larger cross-sectional size than the inner mandrel, said exterior mandrel being aligned with the inner mandrel and at least partially positioned exteriorly of the gates during moulding, and ram means operatively connected to the inner mandrel for moving the inner mandrel axially away from and towards the gates, (ii) injecting molten plastics material through the inlet means into the space between the mould and the inner mandrel, (iii) operating the ram means to cause the newly moulded unit of hollow plastics article to be slid at least partially onto the exterior mandrel, with the rear end of the newly moulded unit of the article remaining in the mould adjacent to the said second end for a further unit to be welded thereto on effecting injection moulding, and with the front end of the newly moulded article being positioned on the exterior mandrel outside the gates for cooling thereof on the exterior mandrel to take place, (iv) allowing the formed unit of the hollow plastics article to cool outside the mould, and (v) repeating steps (ii), (iii) and (iv) until the desired length of hollow plastics article has been formed.

2. A process as claimed in claim 1, wherein the exterior mandrel is moved simultaneously with the inner mandrel due to the exterior mandrel being fast with the inner mandrel but thermally insulated therefrom.

3. A process as claimed in claim 1, wherein step (iii) comprises opening the gates, moving the inner mandrel axially towards the second end and through the gates, gripping the unit of newly moulded hollow plastics article outside the gates and at least partially withdrawing the inner mandrel therefrom back towards the first end into the mould while replacing the inner mandrel within the moulded unit with the exterior mandrel.

4. A process as claimed in claim 1, wherein step (iii) comprises axially withdrawing the inner mandrel at least partially from the unit of the newly moulded hollow plastics article in the mould towards the first end while replacing it within the unit of newly moulded hollow plastics article in the mould by the exterior mandrel, then opening the gates and moving the inner mandrel back towards the second end, thereby causing the newly moulded unit of the hollow plastics article on the exterior mandrel to project at least partially out of the mould, and closing the gates.

* * * * *